US010515421B2

(12) United States Patent
Sekiya

(10) Patent No.: US 10,515,421 B2
(45) Date of Patent: Dec. 24, 2019

(54) HUMAN RESOURCES MANAGEMENT SYSTEM

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 246 days.

(21) Appl. No.: 14/974,057

(22) Filed: Dec. 18, 2015

(65) Prior Publication Data

US 2016/0196616 A1 Jul. 7, 2016

(30) Foreign Application Priority Data

Jan. 6, 2015 (JP) .................................. 2015-000635

(51) Int. Cl.
    *G06Q 40/00* (2012.01)
    *G06Q 10/10* (2012.01)

(52) U.S. Cl.
    CPC ........... *G06Q 40/12* (2013.12); *G06Q 10/105* (2013.01)

(58) Field of Classification Search
    CPC ...... G06Q 40/12; G06Q 10/105; G06Q 20/04; G06Q 20/10
    USPC ....... 705/30, 39, 41, 35; 235/379; 379/114.2
    See application file for complete search history.

(56) References Cited

U.S. PATENT DOCUMENTS

| | | | | |
|---|---|---|---|---|
| 5,537,314 A * | 7/1996 | Kanter | ................. | G06Q 20/342 705/14.13 |
| 6,401,079 B1 * | 6/2002 | Kahn | ................... | G06Q 20/102 705/30 |
| 7,617,138 B1 * | 11/2009 | Gladden | ................ | G06Q 40/12 705/1.1 |
| 8,082,193 B2 * | 12/2011 | Seeley | ................. | G06Q 20/102 705/30 |
| 8,478,638 B2 * | 7/2013 | Postrel | ................. | G06Q 20/105 705/14.1 |
| 8,484,127 B2 * | 7/2013 | Olliphant | ............... | G06Q 20/10 235/380 |
| 8,589,297 B2 * | 11/2013 | Enzaldo | ................. | G06Q 20/04 235/379 |
| 8,751,338 B2 * | 6/2014 | Dombroski | .......... | G06Q 40/125 705/30 |
| 2002/0184148 A1 * | 12/2002 | Kahn | ................... | G06Q 20/102 705/40 |

(Continued)

FOREIGN PATENT DOCUMENTS

JP    2006-185080    7/2006

*Primary Examiner* — Vanel Frenel
(74) *Attorney, Agent, or Firm* — Greer Burns & Crain Ltd.

(57) ABSTRACT

A human resources management system includes an account information storage unit that stores balance information in multiple accounts in which money is pooled and a deposit and withdrawal history of each account. A deposit and withdrawal controlling part updates, on the basis of a reward amount of money to an operation determined between an ordering party and an order receiving party of the operation, information on the balances in an account of the ordering party and an account of the order receiving party and their deposit and withdrawal histories. Information on the balances and the deposit and withdrawal histories of the account is stored in the account information storage unit. An operational performance evaluation unit evaluates an operational performance of an owner of each account in a period on the basis of the deposit and withdrawal history.

10 Claims, 5 Drawing Sheets

(56) References Cited

U.S. PATENT DOCUMENTS

| | | | |
|---|---|---|---|
| 2003/0078765 A1* | 4/2003 | Hoffmaster | G06Q 10/06 703/22 |
| 2006/0259364 A1* | 11/2006 | Strock | G06Q 30/02 705/14.15 |
| 2007/0185721 A1* | 8/2007 | Agassi | G06Q 10/06 705/1.1 |
| 2007/0203828 A1* | 8/2007 | Jung | G06Q 40/025 705/38 |
| 2009/0182654 A1* | 7/2009 | Mullen | G06Q 20/04 705/30 |
| 2009/0240586 A1* | 9/2009 | Ramer | G06F 17/30905 705/14.64 |
| 2010/0042517 A1* | 2/2010 | Paintin | G06Q 30/02 705/30 |
| 2010/0076835 A1* | 3/2010 | Silverman | G06Q 10/06 705/14.33 |
| 2011/0071892 A1* | 3/2011 | Dickelman | G06Q 20/20 705/14.17 |
| 2011/0087569 A1* | 4/2011 | Bidabad | G06Q 40/02 705/30 |
| 2011/0093325 A1* | 4/2011 | Kelsky | G06Q 30/02 705/14.33 |
| 2013/0030889 A1* | 1/2013 | Davich | G06Q 30/02 705/14.14 |
| 2014/0058905 A1* | 2/2014 | Kahn | G06Q 10/06 705/30 |
| 2015/0026060 A1* | 1/2015 | Krietzman | G06Q 20/3221 705/44 |
| 2015/0220963 A1* | 8/2015 | Priebatsch | G06Q 30/0238 705/14.38 |
| 2015/0348084 A1* | 12/2015 | Lynd | G06Q 30/0226 705/14.27 |

* cited by examiner

| Account number | Balance | Deposit and withdrawal history |
|---|---|---|
| ⋮ | ⋮ | ⋮ |
| 00099 | 233,000 | 2014.12.1 : + 50,000<br>2014.12.2 : + 150,000<br>2014.12.2 : - 3,000<br>⋮ |
| 00100 | 1,560,800 | 2014.12.1 : + 200,000<br>2014.12.2 : + 10,000<br>2014.12.3 : + 48,000<br>⋮ |
| 00101 | 749,000 | 2014.12.1 : - 50,000<br>2014.12.1 : + 5,300<br>2014.12.3 : + 120,000<br>⋮ |
| ⋮ | ⋮ | ⋮ |

HUMAN RESOURCES MANAGEMENT SYSTEM

BACKGROUND OF THE INVENTION

Field of the Invention

The present invention relates to a human resources management system which is used when employees and so forth of an enterprise or the like are evaluated.

Description of the Related Art

In an organization such as an enterprise, it is important to take advantages of the ability of the employees and so forth to raise the productivity to maximize the profit. As one of methods for achieving this purpose, personnel evaluation by a supervisor has been carried out conventionally. For example, in the case of a developer of a product, its performance is evaluated on the basis of the quality and so forth of the product which is the achievement. On the other hand, in the case of sales personnel, its performance is evaluated on the basis of the achievement of the sales or the like. Meanwhile, also positions or departments exist by which a direct achievement such as a product or sales is not provided such as middle management personnel or management sections. The performance of an officer who takes such a position or a member of such a department as just described is in most cases evaluated on the basis of the subjectivity of its supervisor, and a great gap sometimes occurs between the recognition of an evaluation object person and an evaluation result. In order to solve this problem, a human resources management system has been proposed in recent years wherein evaluation of an evaluation object person is carried out by a plurality of evaluating persons selected by the evaluation object person itself (refer to, for example, Japanese Patent Laid-Open No. 2006-185080). In the human resources management system, the objectivity of an evaluation result is raised to some degree by the evaluation by a plurality of evaluating persons.

SUMMARY OF THE INVENTION

However, also with the human resources management system described above, the subjectivity of an evaluating person cannot be eliminated fully. Further, in the human resources management system, since a plurality of evaluating persons are selected for one evaluation object person, there is a problem that the burden on each evaluating person is heavy.

Therefore, it is an object of the present invention to provide a human resources management system which suppresses the burden on an evaluating person and ensures the objectivity of an evaluation result.

In accordance with an aspect of the present invention, there is provided a human resources management system including an account information storage unit configured to store information on the balance in each of a plurality of accounts in which money is pooled and a deposit and withdrawal history of each account in an arbitrary period, a deposit and withdrawal controlling part configured to update, on the basis of a reward amount of money to an operation determined between an ordering party and an order receiving party of the operation, information on the balances in an account of the ordering party and an account of the order receiving party and the deposit and withdrawal histories of the account of the ordering party and the account of the order receiving party, information on the balances and the deposit and withdrawal histories of the account being stored in the account information storage unit, and an operational performance evaluation unit configured to evaluate an operational performance of an owner of each account in the period on the basis of the deposit and withdrawal history stored in the account information storage unit.

In accordance with the aspect of the present invention, preferably the operational performance evaluation unit compares an increasing amount of the balance in each account in the period calculated based on the deposit and withdrawal history with a threshold amount of money set in advance to evaluate the operational performance of the owner of the account in the period. In accordance with the aspect of the present invention, preferably the human resources management system further includes a reward money amount determination unit configured to determine the reward amount of money based on information on an order desired amount of money, the information conveyed from the ordering party, and information on an order reception desired amount of money, the information conveyed from the order receiving party. In accordance with the aspect of the present invention, preferably the human resources management system further includes a first terminal apparatus used when the ordering party inputs the order desired amount of money, and a second terminal apparatus used when the order receiving party inputs the order reception desired amount of money. In accordance with the aspect of the present invention, preferably the first terminal apparatus or the second terminal apparatus is a portable type terminal apparatus or a personal computer. In accordance with the aspect of the present invention, preferably the deposit and withdrawal controlling part updates the balances in the account of the ordering party and the account of the order receiving party on the basis of an instruction for deposit or withdrawal from the ordering party or the order receiving party. In accordance with the aspect of the present invention, preferably a virtual currency is adopted as the money. In accordance with the aspect of the present invention, preferably the deposit and withdrawal controlling part increases the balance in a target account on the basis of a result of the evaluation performed by the operational performance evaluation unit. In accordance with the aspect of the present invention, preferably the deposit and withdrawal controlling part decreases the balance in a target account on the basis of a result of the evaluation performed by the operational performance evaluation unit. In accordance with an aspect of the present invention, preferably the deposit and withdrawal controlling part decreases the balance in a target account in response to a payment action of the owner. In accordance with the aspect of the present invention, preferably the order receiving party is an individual and the ordering party is an operational group to which the order receiving party belongs. In accordance with the aspect of the present invention, preferably the order receiving party is an individual and the ordering party is an operational group different from an operational group to which the order receiving party belongs.

The human resources management system according to the present invention includes the account information storage unit configured to store information on the balance in each of a plurality of accounts and a deposit and withdrawal history of each account, the deposit and withdrawal controlling part configured to update the balances in accounts of an ordering party and an order receiving party of an operation and the deposit and withdrawal history of an owner of an account of each of the ordering party and the order receiving party, and the operational performance evaluation unit configured to evaluate an operational performance of the owner of each account based on the deposit and withdrawal history.

Since the reward amount of money to an operation is quantified between an ordering party and an order receiving party in response to an added value and so forth of the operation, a deposit and withdrawal history which reflects the reward amount of money represents the cumulative of values of operations which have been carried out by an owner of each account or which an owner of each account has caused a different person to carry out in an arbitrary period. Since the human resources management system according to the present embodiment utilizes this deposit and withdrawal history, the operational performance of the owner of each account can be evaluated quantitatively. In particular, in the human resources management system according to the present embodiment, since the operational performance of the owner of each account is quantitatively evaluated in a definite form of the deposit and withdrawal history corresponding to reward amounts of money, the burden on the evaluator can be suppressed and the objectivity of a result of the evaluation can be secured.

The above and other objects, features and advantages of the present invention and the manner of realizing them will become more apparent, and the invention itself will best be understood, from a study of the following description and the appended claims with reference to the attached drawings showing a preferred embodiment of the invention.

BRIEF DESCRIPTION OF THE DRAWINGS

FIG. 3 is a table schematically depicting an example of account information stored in an account information storage unit;

DETAILED DESCRIPTION OF THE PREFERRED EMBODIMENT

An embodiment of the present invention is described with reference to the accompanying drawings. The human resources management system according to the present embodiment is configured such that a plurality of accounts corresponding to individuals such as employees who may possibly become a subject of operational activities in the inside of an enterprise or the like and groups which are aggregates of individuals (operational groups, departments or the like) can be utilized to evaluate a business performance of each individual. In an account of each individual, the money obtained by operational activities of the individual is pooled. Meanwhile, in an account of a group, the money corresponding, for example, to a budget allocated to the group in advance is pooled. It is to be noted that, as the money, for example, a currency of reality may be adopted or a virtual currency (points or the like) may be adopted.

Figure 1:
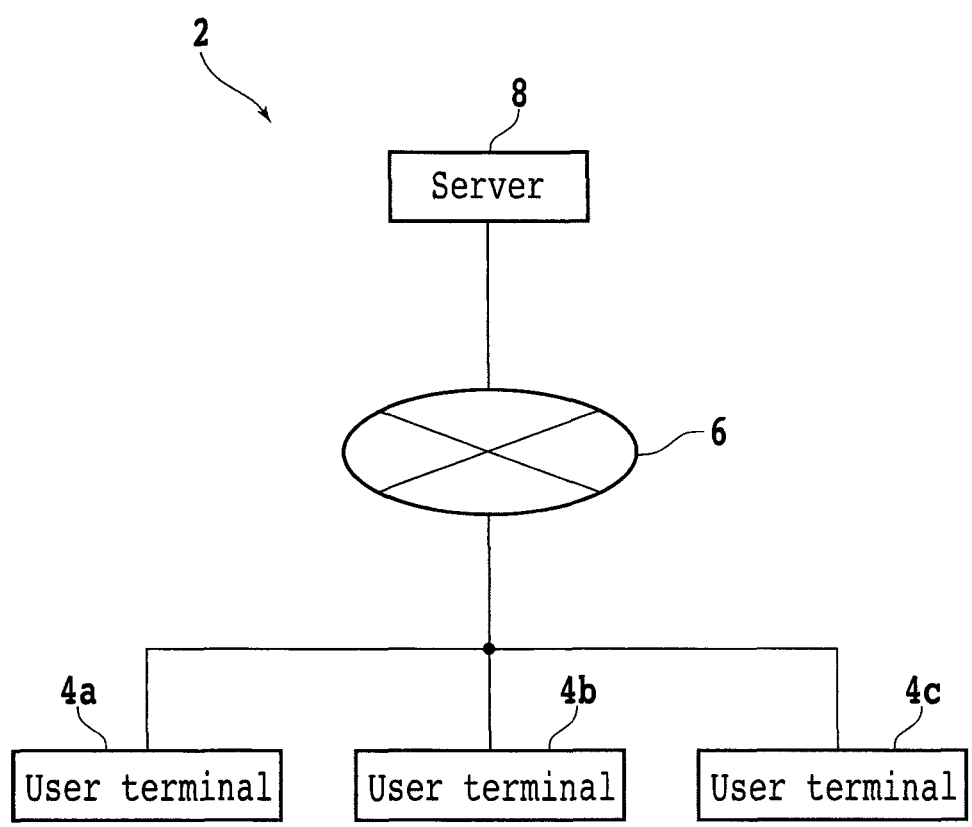
FIG. 1 is a view schematically depicting an example of a configuration of a human resources management system.

FIG. 1 is a view schematically depicting a configuration of a human resources management system according to the present embodiment. As depicted in FIG. 1, the human resources management system 2 of the present embodiment includes a plurality of user terminals (terminal apparatuses) 4a, 4b and 4c owned by individuals or groups, and a server 8 to which the user terminals 4a, 4b and 4c are connected through a network 6. The user terminals 4a, 4b and 4c are, for example, personal computers, portable terminal apparatuses (for example, portable telephone sets) or the like and transmit and receive information necessary for evaluation of operational performances to and from the server 8. It is to be noted that, while only the three user terminals 4a, 4b and 4c are exemplified in the present embodiment, the number of user terminals to be connected to the server 8 is not limited specifically. The server 8 is configured such that it can evaluate operational performances on the basis of information and so forth transmitted thereto from the user terminals 4a, 4b and 4c and is installed, for example, in the inside of an enterprise or the like. However, the server 8 may be installed outside an enterprise or the like. The network 6 is a LAN (Local Area Network) constructed in the inside of an enterprise or the like, a WAN (Wide Area Network) such as the Internet, or the like.

Figure 2:
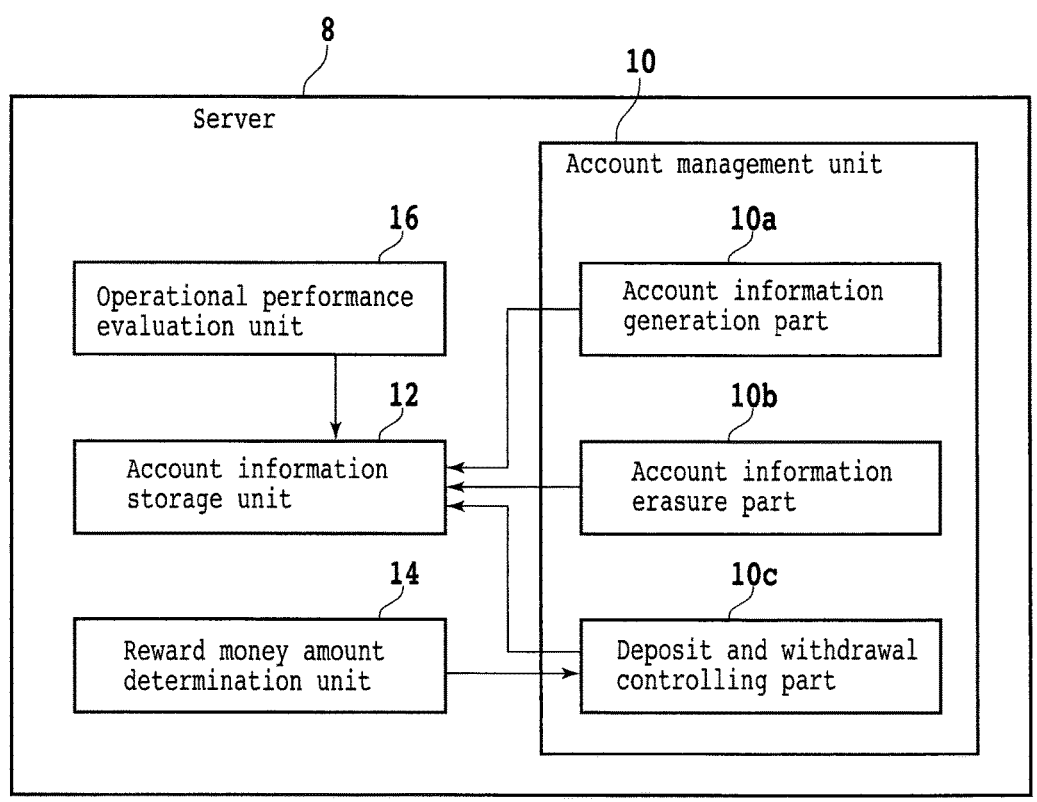
FIG. 2 is a view schematically depicting an example of a configuration of a server.

FIG. 2 is a view schematically depicting an example of a configuration of the server 8. The server 8 includes an account management unit 10 for managing a plurality of accounts described hereinabove. The account management unit 10 includes an account information generation part 10a, an account information erasure part 10b and a deposit and withdrawal controlling part 10c. The account information generation part 10a creates a new account on the basis of an instruction from the user terminal 4a (representatively, a user terminal for a personnel manager), for example, when a new employee or the like subscribes to an enterprise or the like, when a new group is founded or in a like case. More particularly, the account information generation part 10a generates new account information on the basis of information inputted to the user terminal 4a by a personnel manager. The generated account information is stored into an account information storage unit 12. Meanwhile, the account information erasure part 10b erases an account, which has become unnecessary, on the basis of an instruction from the user terminal 4a, for example, in such a case that an employee retires or that a group is abolished or in a like case. More particularly, the account information erasure part 10b erases unnecessary account information from the account information storage unit 12 on the basis of information inputted to the user terminal 4a by the personnel manager.

FIG. 3 is a table schematically illustrating an example of account information stored in the account information storage unit 12. As depicted in FIG. 3, the account information includes at least information relating to an account number allocated corresponding to an individual or a group, information relating to the balance of money pooled in an account, and information relating to a deposit and withdrawal history. The information relating to the balance and the deposit and withdrawal history is rewritten by the deposit and withdrawal controlling part 10c of the account management unit 10.

Meanwhile, the server 8 includes a reward money amount determination unit 14 which determines an order receiving party of an operation and a reward amount of money for the operation on the basis of the information on an order desired amount of money, the information conveyed from the user terminal 4b owned by an individual or a group who is an ordering party of an operation, and the information on an order reception desired amount of money, the information conveyed from the user terminal 4c owned by an individual who becomes an order receiving party (order seeker) of the operation. It is to be noted that, where the ordering party of the operation is a group, the group may be a group to which the order receiving party (order seeker) belongs or a group different from the group to which the order receiving party (order seeker) belongs. In particular, in the human resources management system 2 according to the present embodiment, an order for an operation from a group other than the group to which the order receiving party (order seeker) belongs can be received. A particular function of the reward money amount determination unit 14 is hereinafter described.

If an order receiving party of an operation and a reward amount of money for the operation are determined by the reward money amount determination unit 14, then the ordering party of the operation would use the user terminal 4b to issue an instruction for deposit into the account of the order receiving party. The deposit instruction from the user terminal 4b is conveyed to the deposit and withdrawal controlling part 10c of the account management unit 10. The deposit and withdrawal controlling part 10c receiving the deposit instruction transfers the reward amount from the account of the ordering party to the account of the order receiving party. In particular, the deposit and withdrawal controlling part 10c updates information, which is relating to the balance in the account of the ordering party and the balance in the account of the order receiving party, stored in the account information storage unit 12 in response to the reward amount of money determined by the reward money amount determination unit 14. Further, at this time, the deposit and withdrawal controlling part 10c updates information relating to the deposit and withdrawal history of the account of the ordering party and the account of the order receiving party. Meanwhile, the order receiving party of the operation would carry out the received operation. It is to be noted that the deposit instruction to the deposit and withdrawal controlling part 10c may be performed from the order receiving party side (user terminal 4c) of the operation. Further, the deposit and withdrawal controlling part 10c may control the deposit and the withdrawal automatically on the basis of the reward amount of money determined by the reward money amount determination unit 14. In this case, the deposit instruction or the like to the deposit and withdrawal controlling part 10c can be omitted.

Such a flow of ordering and order reception of an operation, determination of the reward amount of money, transfer to the account of the order receiving party, and operation execution is repeated in an arbitrary period which is an evaluation target. As a result, the balance in each account increases or decreases, and information relating to the deposit and withdrawal history is accumulated into the account information storage unit 12. The accumulated information relating to the deposit and withdrawal history is utilized by an operational performance evaluation unit 16 after the period of an evaluation target comes to an end.

The operational performance evaluation unit 16 reads out the information relating to the deposit and withdrawal history accumulated in the account information storage unit 12 and evaluates the operational performances of the owners of the accounts within the period. In particular, for example, the operational performance evaluation unit 16 calculates an increasing amount of the balance in each account in the period on the basis of the deposit and withdrawal history and compares the increasing amount with an arbitrary threshold amount of money set in advance taking the personnel expenses and so forth into consideration. If the increasing amount of the balance is greater than the threshold amount of money (or is equal to or greater than the threshold amount of money), then the operational performance evaluation unit 16 evaluates the operation performance of the owner of the account as "acceptable." On the other hand, if the increasing amount of the balance is equal to or smaller than the threshold amount of money (or smaller than the threshold amount of money), the operational performance evaluation unit 16 evaluates the operational performance of the owner of the account as "unacceptable." It is to be noted that the threshold amount of money to be used as a reference for evaluation may be set to multi-stages. In this case, evaluation among multi-stages such as "excellent," "good," "acceptable" and "unacceptable" can be carried out. Further, the deposit and withdrawal controlling part 10c may be configured such that the balance in an account of a target can be increased or decreased on the basis of a result of evaluation performed by the operational performance evaluation unit 16. This makes it possible to add an amount of money corresponding to a reward amount of money to the balance in a certain target account in response to a result of evaluation of the operational performance (representatively, "excellent," "good," "acceptable" or the like) with regard to the owner of the account. Still further, also it is possible to subtract an amount of money corresponding to a penalty (charge) or the like from the balance in a certain target account in response to a result of evaluation of the operational performance (representatively, "unacceptable" or the like) with regard to the owner of the account. Still further, a cost required for an operation, an expenditure originating from a personal expenditure or the like may be subtracted from the balance in the target account.

Figure 4:
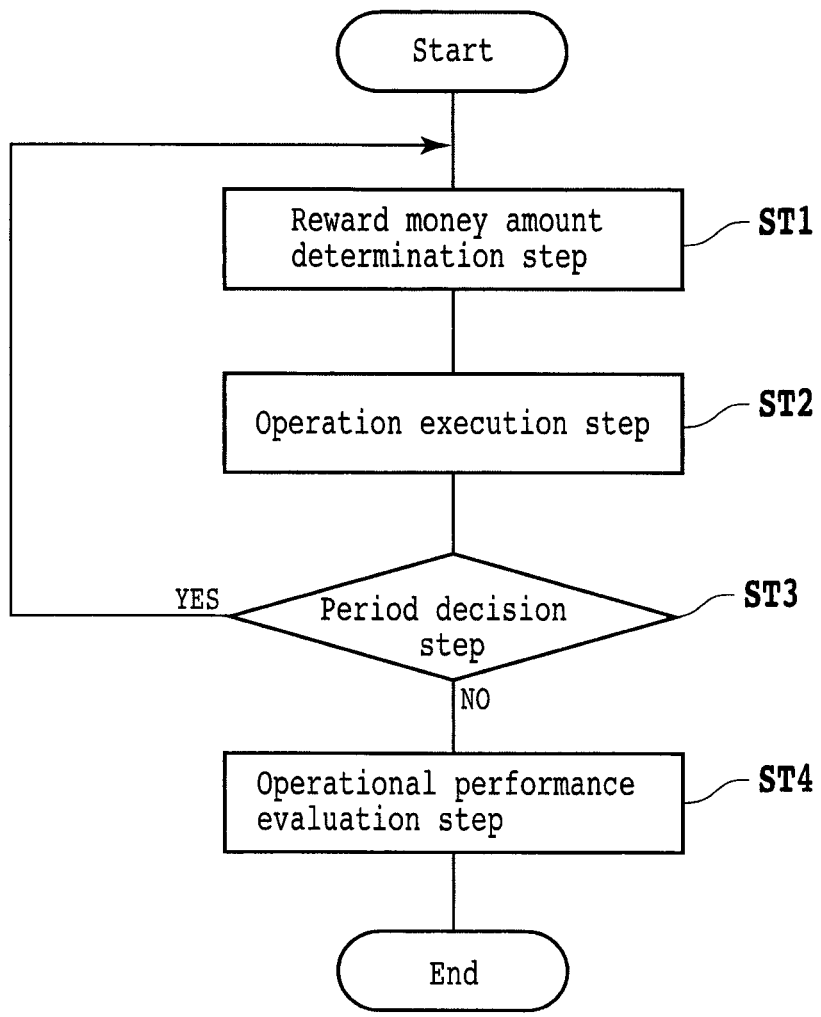
FIG. 4 is a flow chart illustrating a flow of a human resources management method.

Now, a human resources management method carried out by such a human resources management system 2 as described above is described. FIG. 4 is a flow chart illustrating a flow of the human resources management method according to the present embodiment. As depicted in FIG. 4, the human resources management method according to the present embodiment includes a reward money amount determination step ST1 for determining a reward amount of money between an ordering party and an order receiving party of an operation, an operation execution step ST2 at which the ordering party pays the reward amount of money and the order receiving party carries out the operation, a period decision step ST3 for deciding whether or not the period of the evaluation target is to be ended, and an operational performance evaluation step ST4 for evaluating the operational performance in the period on the basis of the deposit and withdrawal history of money of each account.

Figure 5:
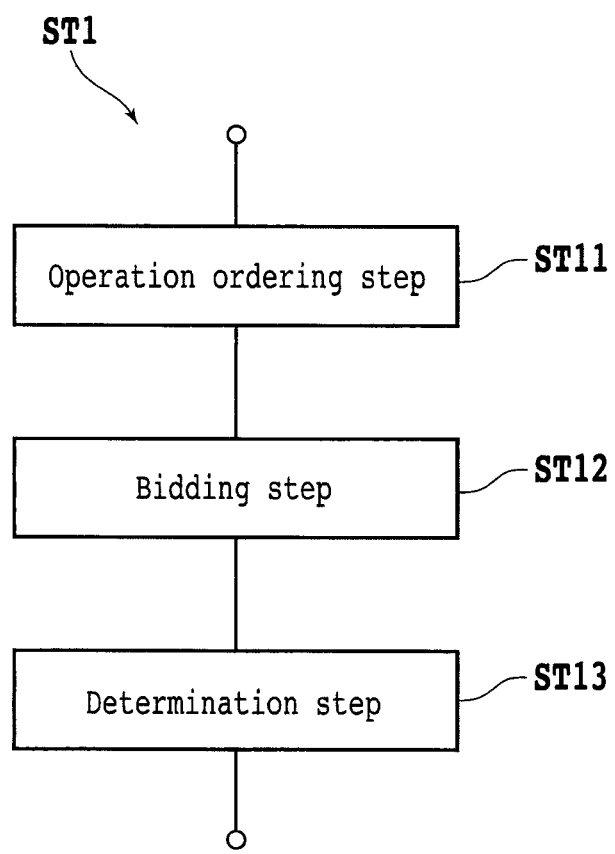
FIG. 5 is a flow chart illustrating a flow of a reward amount determination step.

FIG. 5 is a flow chart illustrating a flow of the reward money amount determination step ST1. In FIG. 5, it illustrates a flow in a case where the reward amount of money to an operation is determined in an auction form. First, an operation ordering step ST11 is carried out. At the operation ordering step ST11 an individual or a group who desires ordering of an operation presents an order desired amount of money together with contents of the operation. At the operation ordering step ST11, for example, the individual or the group who wants to issue an order of an operation would input contents of an operation and an order desired amount of money to the user terminal 4b owned by the individual or the group. The information inputted to the user terminal 4b is conveyed from the user terminal 4b to the server 8. The reward money amount determination unit 14 of the server 8 sets the order desired amount of money included in the information conveyed thereto to a start amount of money for an auction.

After the operation ordering step ST11, a bidding step ST12 is carried out. At the bidding step ST12, for example, a notification of the contents and the start amount of money at an auction of the ordered operation is issued from the server 8 to the user terminal 4c owned by an individual (order reception desiring person) who desires reception of the order of the operation. Then, the order reception desiring person would input the content of the operation which the order reception desiring person wants to receive and an order desired amount of money to the user terminal 4c of the order desiring person itself on the basis of the information conveyed thereto from the server 8. It is to be noted that the order reception desired amount of money may be set to any of an amount of money lower than or higher than the starting price. For example, where the number of order reception desiring persons is great as in the case of competitive bedding, there is a tendency that the order reception desired amount of money becomes lower than the start price. However, where the number of order reception desiring persons is small, the reception desired amount of money sometimes becomes higher than the start price. The information inputted to the user terminal 4c is conveyed from the user terminal 4c to the server 8. For example, if a predetermined period of time elapses after starting of the auction, then the bidding step ST12 ends. It is to be noted that the bidding step ST12 may be ended otherwise in response to a condition such as the number of bidders, an order reception desired amount of money of the bidders or the like.

After the bidding step ST12, a determination step ST13 for determining an order receiving party of the operation and a reward amount of money is carried out. At the determination step ST13, the reward money amount determination unit 14 determines, for example, an individual who has presented the lowest order reception desired amount of money as an order receiving party and determines the order reception desired amount of money of the order receiving party as a reward amount of money. It is to be noted that a next mark order bidder or the like may be determined as an order receiving party and the order reception desired amount of money of the order receiving party may be determined as a reward amount of money by authority or the like of the ordering party. By the reward money amount determination step ST1 described above, a reward amount of money for the operation is determined.

However, the reward money amount determination step ST1 may not necessarily be carried out in such an auction form. For example, also it is possible for an ordering party and an order receiving party of an operation to determine a reward amount of money by consultation or the like. If the auction form is not adopted, then the reward money amount determination unit 14 may be omitted from the server 8.

After the reward money amount determination step ST1, the operation execution step ST2 at which the ordering party pays the reward amount of money and the order receiving party carries out the operation is carried out. In particular, the ordering party of the operation would use the user terminal 4b to issue an instruction for deposit to the account of the order receiving party. The deposit and withdrawal controlling part 10c receiving the instruction for deposit from the user terminal 4b transfers the reward amount of money determined by the reward money amount determination unit 14 from the account of the ordering party to the account of the order receiving party. Together with this, the deposit and withdrawal controlling part 10c updates the information relating to the deposit and withdrawal histories of the account of the ordering party and the account of the order receiving party. However, the reward amount of money may be transferred not from the account of the ordering party but from the account of the group to which the ordering party belongs to the account of the order receiving party. It is to be noted that, where the reward money amount determination unit 14 is omitted or in an like case, information of the name (or an account number) of the ordering party, the name (or an account number) of the order receiving party, a reward amount of money and so forth are conveyed, for example, from the user terminal 4b to the server 8. Consequently, the deposit and withdrawal controlling part 10c can transfer the determined reward amount of money from the account of the ordering party to the account of the order receiving party without the intervention of the reward money amount determination unit 14.

Further, the order receiving party of the operation would carry out the operation of the received order. It is to be noted that the ordering party of the operation can add a condition for a performance deadline or the like to the operation. If the order receiving party violates this condition, then, for example, the ordering party can ask for the payment of the penalty to the order receiving party. The penalty is paid, for example, by notifying the deposit and withdrawal controlling part 10c of the name (or the account number) of the ordering party, the name (or the account number) of the order receiving party, the amount of money of the penalty and so forth.

After the operation execution step ST2, the period decision step ST3 for deciding whether or not the period of the evaluation target elapses is carried out. If the period of the evaluation target does not elapse (period decision step ST3: NO), then the reward money amount determination step ST1 and the operation execution step ST2 described above are carried out repetitively. Alternatively, if the period of the evaluation target elapses (period decision step ST3: YES), then the operational performance evaluation step ST4 for evaluating the operational performance in the period is carried out on the basis of the deposit and withdrawal history of each account.

At the operational performance evaluation step ST4, for example, the operational performance evaluation unit 16 calculates an increasing amount of the balance in each account in the period on the basis of the deposit and withdrawal history stored in the account information storage unit 12, and compares the increasing amount with an arbitrary threshold amount of money set in advance taking the personnel expenses and so forth into the consideration. A result of the evaluation is conveyed, for example, from the server 8 to the user terminal 4a for the personnel manager.

As described above, the human resources management system 2 according to the present embodiment includes an account information storage unit 12 configured to store the information on the balance in each of a plurality of accounts and a deposit and withdrawal history of each account, a deposit and withdrawal controlling part 10c configured to update the balances in accounts of an ordering party and an order receiving party of an operation and the deposit and withdrawal history of an owner of an account of each of the ordering party and the order receiving party, and an operational performance evaluation unit 16 configured to evaluate an operational performance of the owner of each account based on the deposit and withdrawal history.

Since the reward amount of money to an operation is quantified between an ordering party and an order receiving party in response to an added value and so forth of the operation, a deposit and withdrawal history which reflects the reward amount of money represents the cumulative of values of operations which have been carried out by an owner of each account or which an owner of each account has caused a different person to carry out in an arbitrary period. Since the human resources management system 2 and the human resources management method according to the present embodiment utilize this deposit and withdrawal history, the operational performance of the owner of each account can be evaluated quantitatively. In particular, in the human resources management system 2 and the human resources management method according to the present embodiment, since the operational performance of the owner of each account is quantitatively evaluated in a definite form of the deposit and withdrawal history corresponding to reward amounts of money, the burden on the evaluator can be suppressed and the objectivity of a result of the evaluation can be secured.

Further, in the human resources management system 2 and the human resources management method according to the present embodiment, also such effects as described below can be achieved. First, since each individual can receive an order of a work from a party outside a group to which the individual belongs, an operation in which each individual is good can be selected freely without being bounded by the scope of work of the group to which the individual belongs. Consequently, the ability of each individual can be exploited sufficiently.

Further, since an individual who has a high performance and skill can focus on a work having a high added value while another individual who is inferior in the performance and skill is inevitably engaged in an operation having a low added value, a prosecutor of an operation is optimized. Further, each individual will voluntarily try to improve its skills so as to be in charge of a work having a higher added value. Further, since each individual can quantitatively grasp the own operational performance, the self-management regarding the own way of working is stimulated.

Further, since a consideration is generated in the form of a reward amount of money in regard to all operations, an operation which is not valuable for a consideration (namely, an operation unnecessary to the enterprise or the like) is integrated or abolished. As a result, the administration is made more efficient. Further, by quantification of operational activities, the necessity for management and monitoring of the subordinates by their leader is eliminated. As a result, various privileges are delegated to the subordinates and a more speedy business activity can be realized. Further, by introducing the system for a reward amount of money or a penalty (charge), good quality behavior change desirable to the enterprise or the like can be encouraged.

It is to be noted that the present invention is not restricted to the description of the embodiment described above but can be carried out in various modified forms. For example, while the foregoing description of the embodiment is directed to a human resources management system in which principally employees of an enterprise are targeted, in the human resources management system of the present invention, the officers of an enterprise or the like may be set as a target of evaluation. Similarly, also it is possible to use the human resources management system 2 of the present embodiment when members or the like in an organization other than an enterprise are evaluated.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A management system including a plurality of user terminals in communication with a server, for calculating total points earned by a target party in an organization based on at least one operation performed by the target party, the system comprising:
   an account information storage unit, provided in the server, configured to store information on a balance in an account of the target party in which points earned by the target party from performing the at least one operation are accumulated and a deposit and withdrawal history of the points in the account in an arbitrary period;
   a point determination unit, provided in the server, configured to determine an amount of points to be earned by the target party for performing a target operation by the target party,
   wherein the target operation is ordered from a server by an ordering party through a first user terminal and received from the server by the target party through a second user terminal, and the amount of points to be earned by the target party for performing the target operation by the target party is determined based on a first desired amount of points conveyed to the server from the ordering party and a second desired amount of points conveyed to the server from the target party prior to the target party performing the target operation;
   a deposit and withdrawal controlling part, provided in the server, configured to update, on a basis of the amount of points for performing the target operation determined by the point determination unit, the balance and the deposit and withdrawal histories of the points in the account of the target party, information on the balances and the deposit and withdrawal histories of the account being stored in the account information storage unit; and
   an operational performance evaluation unit, provided in the server, configured to evaluate an operational performance of the target party in the arbitrary period on a basis of the deposit and withdrawal history of the points stored in the account of the target party.

2. The management system according to claim 1, wherein the operational performance evaluation unit compares an increasing amount of the balance in the account of the target party in the period calculated based on the deposit and withdrawal history with a threshold amount of point set in advance to evaluate the operational performance of the target party in the period.

3. The management system according to claim 1, wherein the first user terminal or the second user terminal is a portable type terminal apparatus or a personal computer.

4. The management system according to claim 1, wherein the deposit and withdrawal controlling part updates the balances in an account of the ordering party and the account of the target party on the basis of an instruction for deposit or withdrawal from the ordering party or the target party.

5. The management system according to claim 1, wherein a virtual currency or money is adopted as the points.

6. The management system according to claim 1, wherein the deposit and withdrawal controlling part increases the balance in the account of the target party on a basis of a result of the evaluation performed by the operational performance evaluation unit.

7. The management system according to claim 1, wherein the deposit and withdrawal controlling part decreases the balance in the account of the target party on a basis of a result of the evaluation performed by the operational performance evaluation unit.

8. The human resources management system according to claim 1, wherein the deposit and withdrawal controlling part decreases the balance in a target account in response to a payment action of the owner.

9. The management system according to claim 1, wherein the target party is an individual and the ordering party is an operational group to which the target party belongs.

10. The management system according to claim 1, wherein the target party is an individual and the ordering party is an operational group different from an operational group to which the target party belongs.

* * * * *